US010906369B2

(12) United States Patent
Fekete et al.

(10) Patent No.: US 10,906,369 B2
(45) Date of Patent: Feb. 2, 2021

(54) VEHICLE FRONT END ASSEMBLY

(71) Applicants: Nissan North America, Inc., Franklin, TN (US); Nissan Motor Co., Ltd., Yokohama (JP)

(72) Inventors: Stephen Fekete, Royal Oak, MI (US); Ryan Corby, Novi, MI (US); Adam Strean, Highland Township, MI (US); Takahiro Watanabe, Kanagawa (JP); Yunosuke Yamada, Kanagawa (JP); Musashi Kishida, Kanagawa (JP)

(73) Assignees: Nissan North America, Inc., Franklin, TN (US); NISSAN MOTOR CO., LTD., Kanagawa (JP)

( * ) Notice: Subject to any disclaimer, the term of this patent is extended or adjusted under 35 U.S.C. 154(b) by 2 days.

(21) Appl. No.: 16/176,469

(22) Filed: Oct. 31, 2018

(65) Prior Publication Data
US 2020/0130445 A1    Apr. 30, 2020

(51) Int. Cl.
  *B60G 7/00*    (2006.01)
  *B60G 7/02*    (2006.01)
(52) U.S. Cl.
  CPC .............. *B60G 7/001* (2013.01); *B60G 7/02* (2013.01); *B60G 7/005* (2013.01); *B60G 2204/1431* (2013.01); *B60G 2206/016* (2013.01); *B60G 2206/12* (2013.01); *B60G 2206/122* (2013.01)
(58) Field of Classification Search
  CPC .......... B60G 7/001; B60G 7/02; B60G 7/005; B60G 2204/1431; B60G 2206/12; B60G 2206/122; B60G 2206/016
  See application file for complete search history.

(56) References Cited

U.S. PATENT DOCUMENTS

| | | | | |
|---|---|---|---|---|
| 4,595,216 A | * | 6/1986 | Ware | B60G 7/02 267/36.1 |
| 5,288,100 A | * | 2/1994 | Cherry | B60G 7/02 280/86.75 |
| 5,398,411 A | * | 3/1995 | Kusaka | B23P 13/04 280/124.134 |
| 8,646,793 B1 | | 2/2014 | Lam et al. | |
| 2001/0022437 A1 | * | 9/2001 | Suzuki | B60G 7/02 280/124.134 |
| 2002/0136592 A1 | * | 9/2002 | Abels | B60G 7/001 403/270 |

(Continued)

*Primary Examiner* — Frank B Vanaman
(74) *Attorney, Agent, or Firm* — Global IP Counselors, LLP

(57) ABSTRACT

A vehicle front end assembly includes an engine cradle, a transverse link and a fastener. The engine cradle has an upper attachment portion and a lower attachment portion, both being rigidly attached to the engine cradle. The upper attachment portion has a recessed area that includes a first opening extending through the recessed area. The upper attachment portion has a first overall thickness with a portion of the recessed area surrounding the first opening having a second thickness that is greater than the first thickness. The lower attachment portion has a second opening below the first opening. The transverse link has an inboard portion with a third opening that extends through the inboard portion. The fastener passes through the first opening, the third opening and the second opening such that the fastener retains the transverse link to the upper attachment portion and the lower attachment portion of the engine cradle.

16 Claims, 8 Drawing Sheets

(56) References Cited

U.S. PATENT DOCUMENTS

| | | | |
|---|---|---|---|
| 2014/0252741 A1* | 9/2014 | Corby | B62D 7/18 |
| | | | 280/124.134 |
| 2014/0291956 A1 | 10/2014 | Corby et al. | |
| 2016/0236529 A1* | 8/2016 | Sakaguchi | B60G 7/02 |
| 2017/0087948 A1* | 3/2017 | Morishige | B62D 21/11 |

* cited by examiner

VEHICLE FRONT END ASSEMBLY

BACKGROUND

Field of the Invention

The present invention generally relates to vehicle front end assembly that includes an engine cradle and a transverse link. More specifically, the present invention relates to an attachment portion of the engine cradle that includes a recessed area with a greater thickness than a remainder of the attachment portion such that an outboard area of the transverse link breaks away from inboard portions of the transverse link more readily than a breakaway at the attachment portion in response to an impact event.

Background Information

An impact event sometimes imparts an impact force to a front wheel and/or steering linkage components of a vehicle.

SUMMARY

One object of the present disclosure is to provide a vehicle front end assembly with structural reinforcements that provide an engine cradle with sufficient strength such that in response to an impacting force acting on a wheel and/or transverse link, outboard portions of the transverse link breakaway from inboard portions of the transverse link prior to deformation and/or a breakaway of the transverse link from the structural reinforcements of the engine cradle.

In view of the state of the known technology, one aspect of the present disclosure is to provide a vehicle front end assembly with an engine cradle, a transverse link and a fastener. The engine cradle has an upper attachment portion and a lower attachment portion spaced apart from one another with both being rigidly attached to the engine cradle. The upper attachment portion has a recessed area that includes a first opening extending through the recessed area. The upper attachment portion has a first overall thickness with a portion of the recessed area surrounding the first opening having a second thickness that is greater than the first thickness. The lower attachment portion has a second opening below the first opening. The transverse link has an inboard portion with a third opening that extends through the inboard portion. The fastener passes through the first opening, the third opening and the second opening such that the fastener retains the transverse link to the upper attachment portion and the lower attachment portion of the engine cradle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
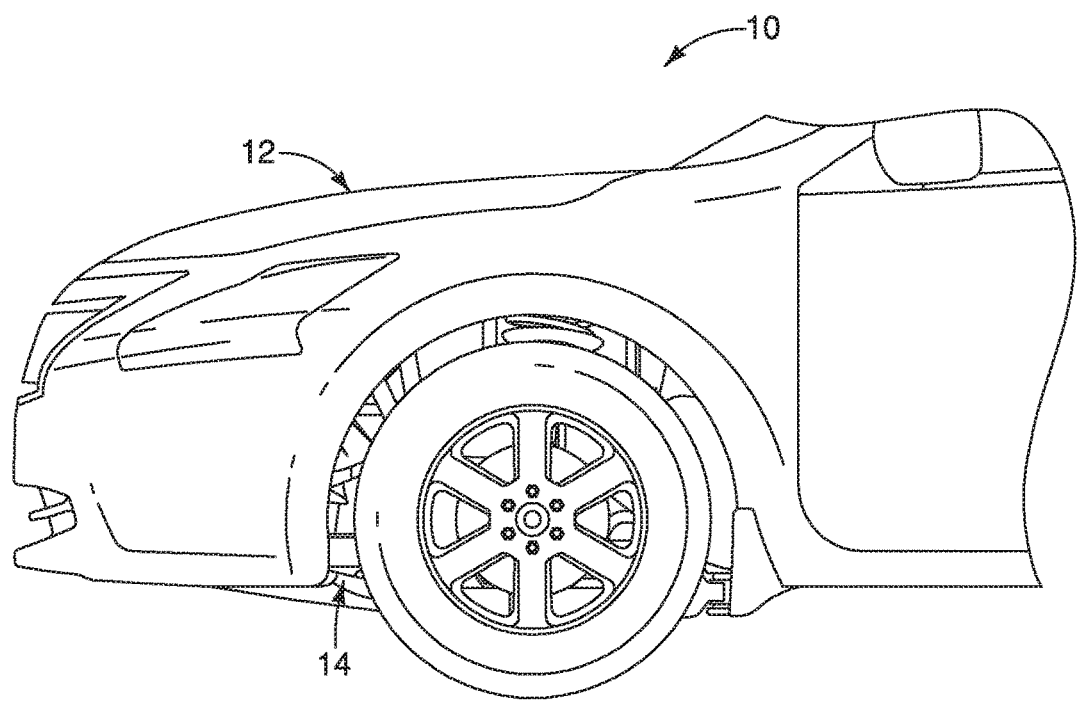
FIG. 1 is a side view of a vehicle that includes a vehicle front end assembly in accordance with an exemplary embodiment.

Referring initially to FIG. 1, a vehicle 10 having a vehicle body structure 12 that includes a vehicle front end assembly 14 is illustrated in accordance with a first embodiment.

Figure 2:
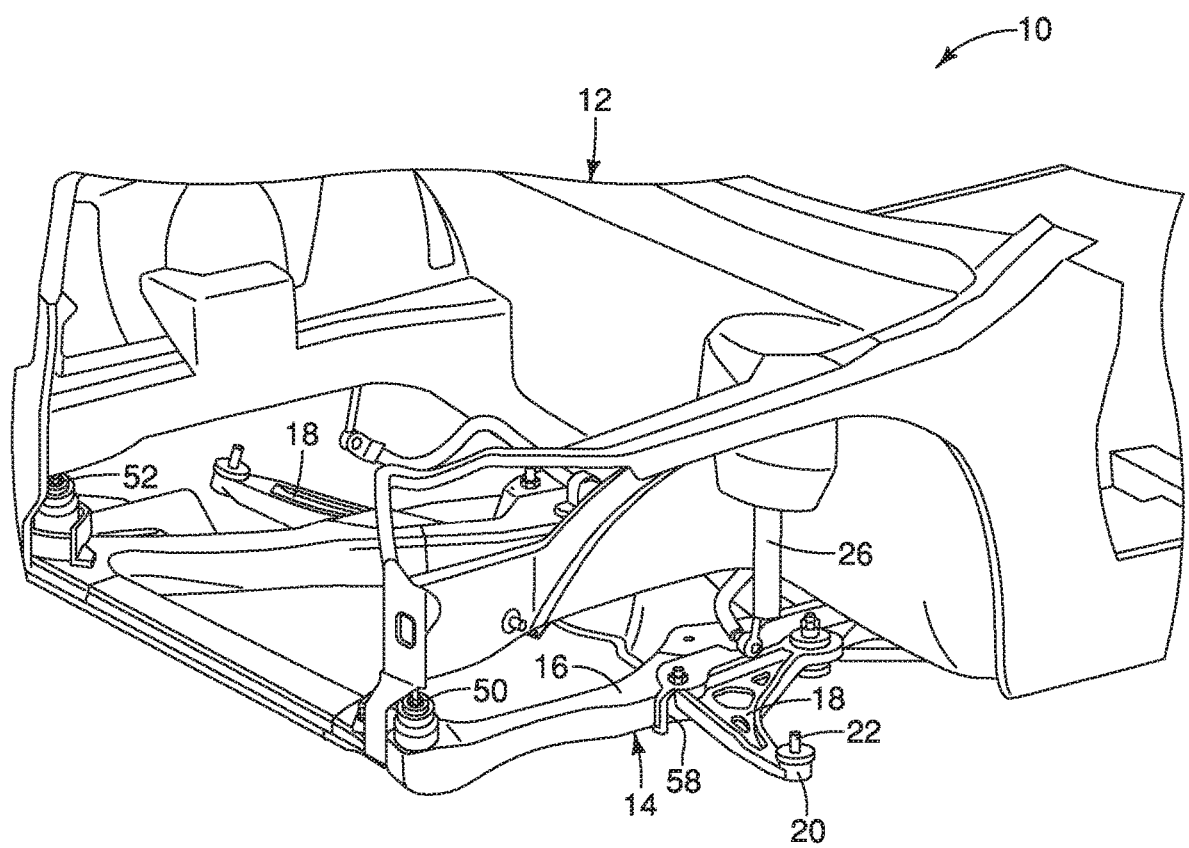
FIG. 2 is a perspective view of the vehicle with a hood, venters and bumper structure removed showing an engine cradle and the vehicle front end assembly, in accordance with the exemplary embodiment.

As shown in FIG. 2, the vehicle front-end assembly 14 (hereinafter the front-end assembly 14) includes an engine cradle 16 and a transverse link 18 attached to the engine cradle 16 in a manner described in greater detail below. It should be understood from FIG. 2 and the description herein that the front fenders, doors, engine, transmission and various engine compartment components have been removed in FIG. 2 for the sake of clarity and simplicity. Further, several elements of the front-end assembly 14 are removed in FIG. 2 in order to show attachments between the engine cradle 16 and the transverse link 18.

Figure 3:
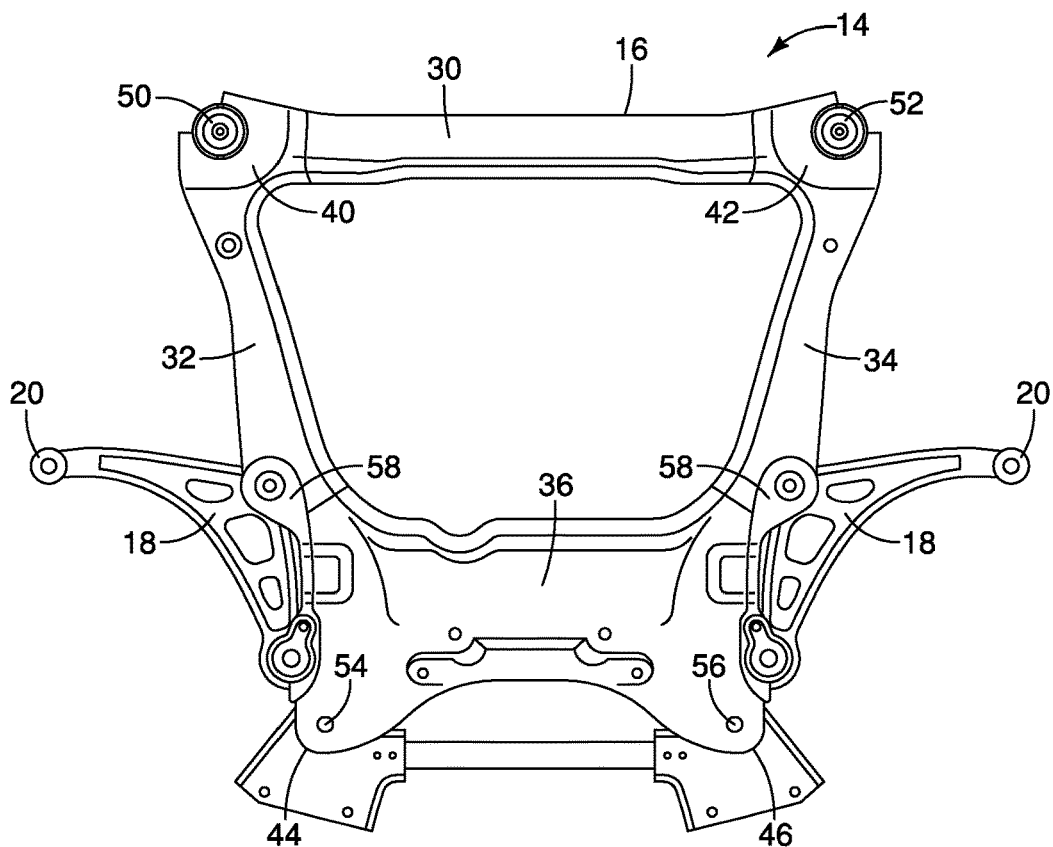
FIG. 3 is a top view of the engine cradle and the vehicle front end assembly in accordance with the exemplary embodiment.

As shown in FIG. 3, there are two transverse links 18, one on either side of the engine cradle 16. Each rearward side of the engine cradle 16 is identical to the other rear side, except that they are mirror images of one another with symmetry relative to a center line of the vehicle 10. Further, the two transverse links 18 are also identical, except that they are mirror images of one another with symmetry relative to a center line of the vehicle 10. Therefore, in the description below, only one side of the engine cradle 16 and one of the transverse links 18 is described in detail below for the sake of brevity, since the description applies equally to both sides of the engine cradle 16 and both of the transverse links 18.

Figure 4:
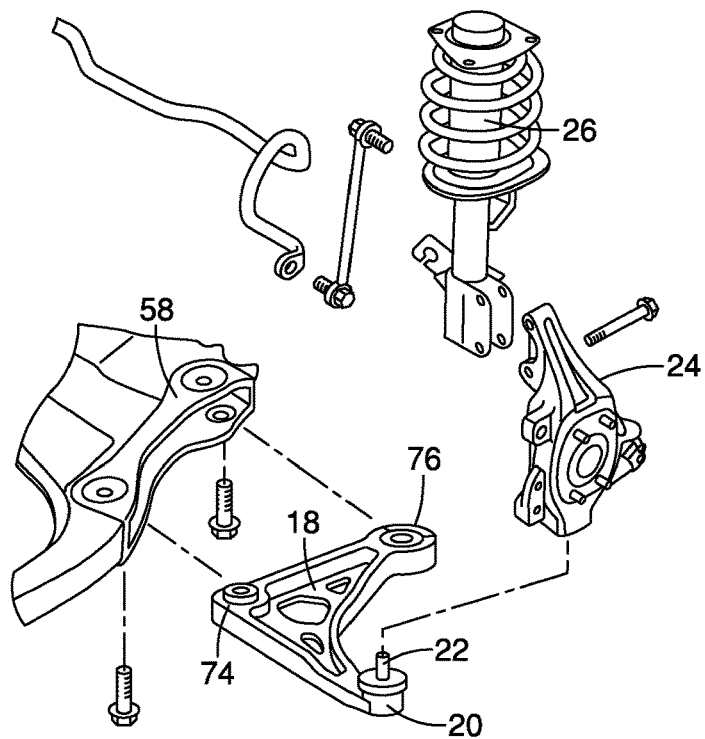
FIG. 4 is a perspective exploded view of a rear outboard side of the engine cradle and the vehicle front end assembly including suspension and steering components such as a transverse link, a steering knuckle and a strut assembly in accordance with the exemplary embodiment.
Figure 5:
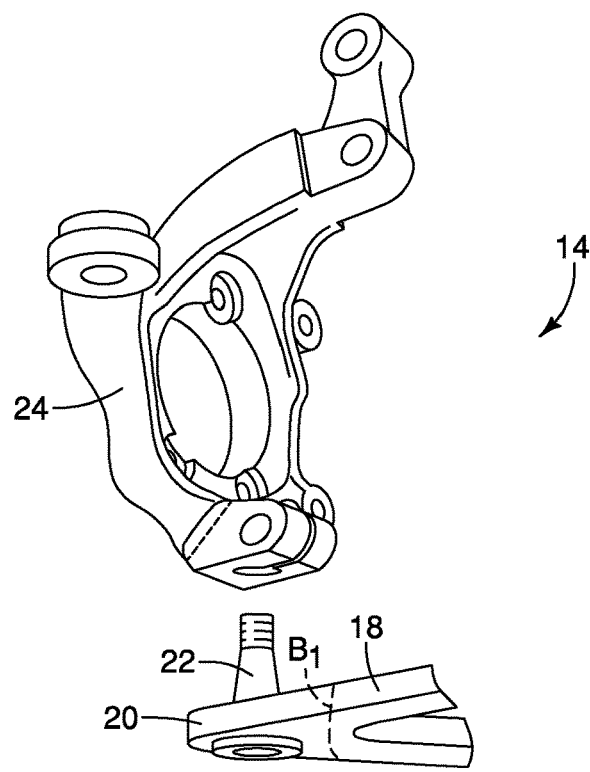
FIG. 5 is another perspective exploded view showing the transverse link and the steering knuckle in accordance with the exemplary embodiment.

As shown in FIGS. 4 and 5, an outboard end 20 of the transverse link 18 includes a ball joint 22 that further attaches to a lower end of a steering knuckle 24. The steering knuckle 24 is further attached to a strut 26. Since ball joints, steering knuckles and struts, in general, are conventional vehicle front-end components, further description is omitted for the sake of brevity.

Figure 6:
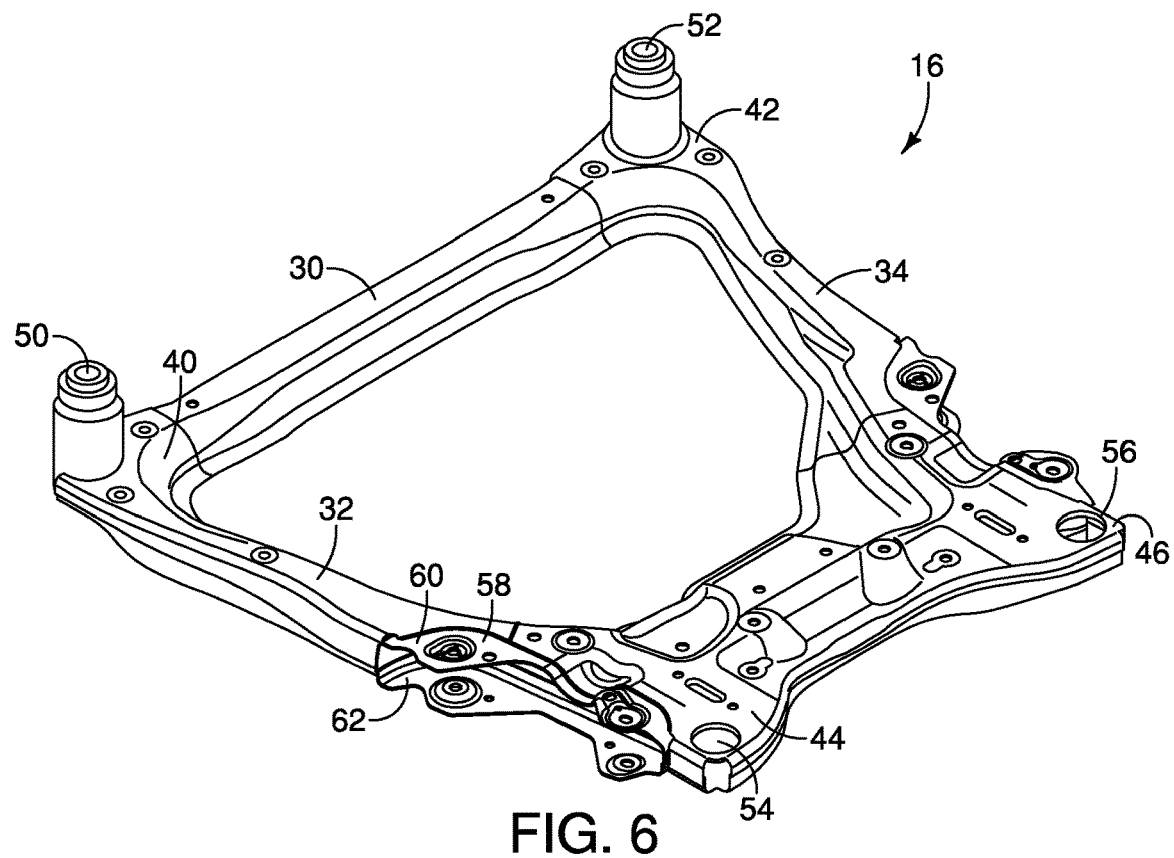
FIG. 6 is a perspective view of the engine cradle removed from the vehicle and with all suspension and steering components removed showing an attachment assembly that attaches to the transverse link in accordance with the exemplary embodiment.

A description of the engine cradle 16 of the front-end assembly 14 is now provided with specific reference to FIGS. 3 and 6.

The engine cradle 16 includes a front engine cradle member 30, a driver's side engine cradle member 32, a passenger's side engine cradle member 34 and a rear engine cradle member 36. The front engine cradle member 30 and the driver's side engine cradle member 32 are fixedly attached to one another such that the intersection between them defines a first front corner 40. The front engine cradle member 30 and the passenger's side engine cradle member 34 are fixedly attached to one another such that the intersection between them defines a second front corner 42. The driver's side engine cradle member 32 and the rear engine cradle member 36 are fixedly attached to one another. Rearward of an intersection between the driver's side engine cradle member 32 and the rear engine cradle member 36, a first rear corner 44 of the engine cradle is defined. The passenger's side engine cradle member 34 and the rear engine cradle member 36 are fixedly attached to one another. Rearward of an intersection between the passenger's side engine cradle member 34 and the rear engine cradle member 36, a second rear corner 46 of the engine cradle 16 is defined. The engine cradle 16 mounts to an underside of the vehicle body structure 12 at four body attachment structures 50, 52, 54 and 56 as shown in FIG. 2, in a conventional manner.

The engine cradle 16 is basically a plurality of shaped and contoured metallic elements that are welded together to form the depicted shape of the engine cradle 16, as shown in FIGS. 3 and 6. Although not shown, portions of the engine cradle 16 have hollow interiors. The driver's rearward side of the engine cradle 16 forward of the attachment structure 54 and the passenger's rearward side of the engine cradle 16 forward of the attachment structure 56 are identical, but mirror images of the one another. The description below of the driver's rearward side of the engine cradle 16 therefore equally applies to the passenger's rearward side of the engine cradle 16. Thus, description of the passenger's rearward side of the engine cradle 16 is omitted for the sake of brevity.

The driver's rearward side of the engine cradle 16 opens to a hollow interior of the engine cradle 16. The hollow interior (not shown) of the engine cradle 16 is concealed by an attachment assembly 58 (also referred to as a link attachment assembly 58) that includes an upper attachment member 60 and a lower attachment member 62, as shown in FIGS. 7 and 8.

Figure 8:
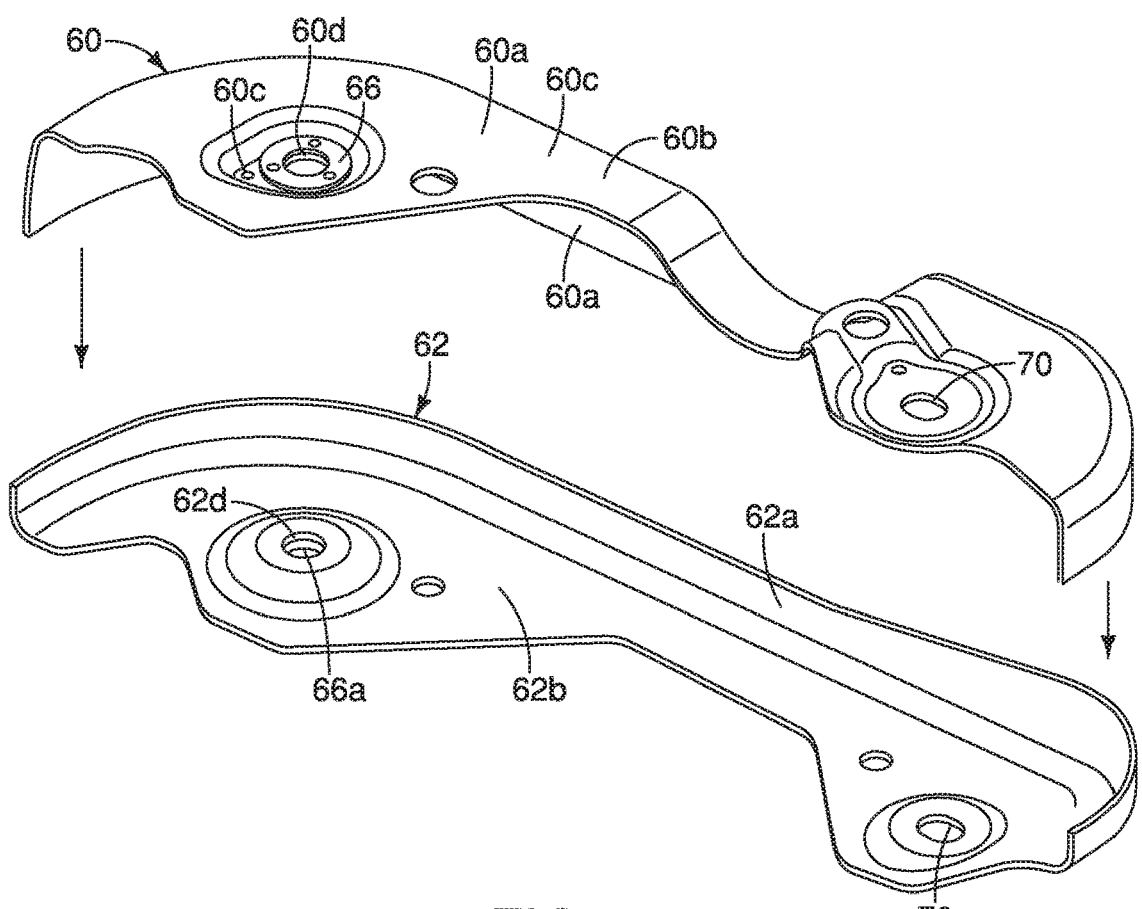
FIG. 8 is an exploded perspective view of the attachment assembly removed from the engine cradle showing an upper attachment member and a lower attachment member in accordance with the exemplary embodiment.

As shown in FIG. 8, the upper attachment member 60 includes a contoured back wall 60a and an upper wall that is hereinafter referred to as an upper attachment portion 60b. When installed to the engine cradle 16, the contoured back wall 60 is upright or vertically oriented extending downward from the upper attachment portion 60b, and, the upper attachment portion 60b is horizontally oriented. Similarly, the lower attachment member 62 includes a contoured back wall 62a and a lower wall 62b that is hereinafter referred to as a lower attachment portion 62b. When installed to the engine cradle 16, the contoured back wall 62 is upright or vertically oriented extending upward from the lower attachment portion 62b, and, the lower attachment portion 62b is horizontally oriented.

Figure 7:
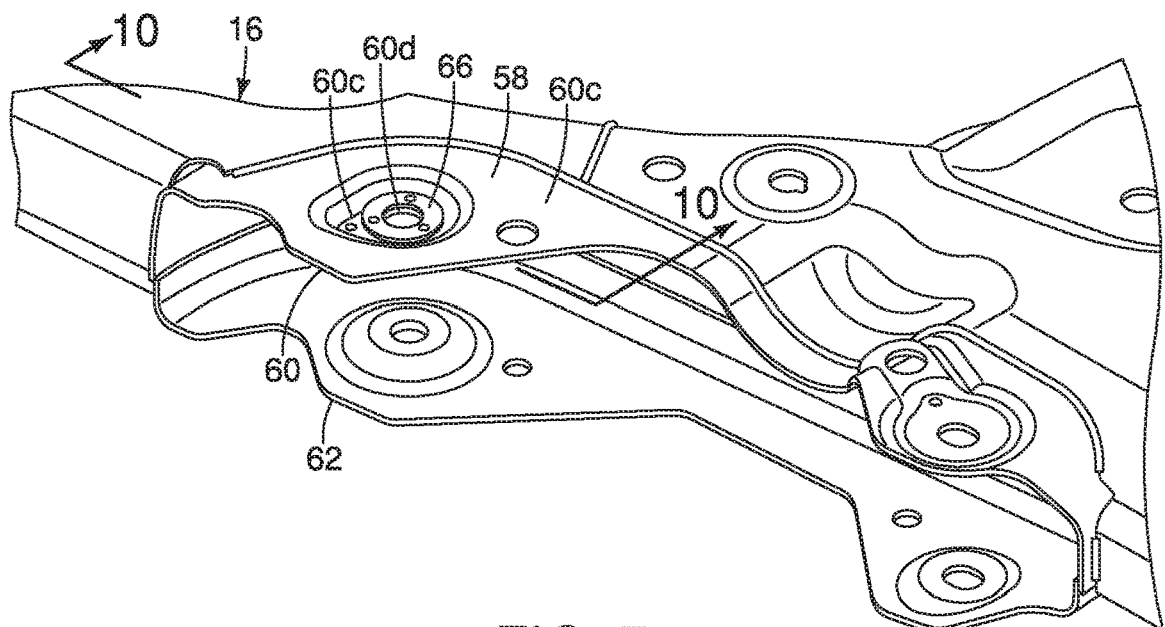
FIG. 7 is a perspective view of a rearward outboard area of the engine cradle showing the attachment assembly in accordance with the exemplary embodiment.
Figure 11:
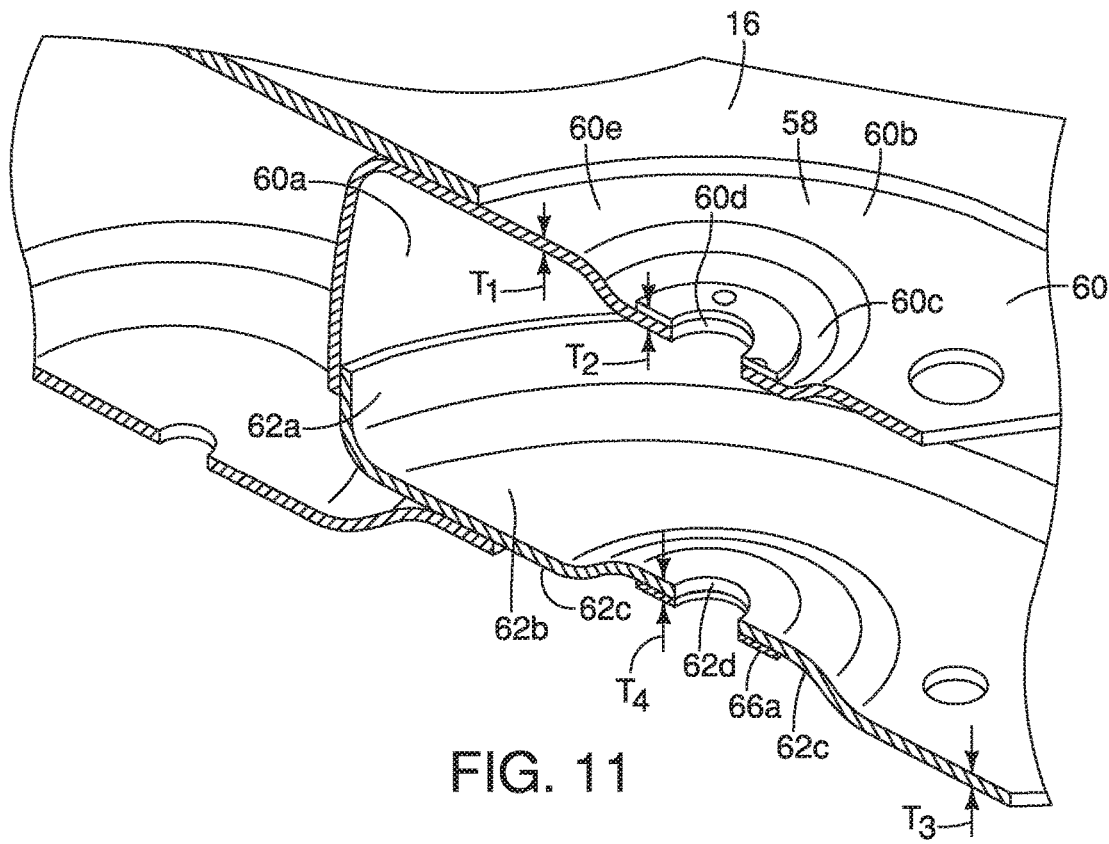
FIG. 11 is a cross-sectional perspective view of the attachment assembly taken along the line 10-10 in FIG. 7 in accordance with the exemplary embodiment.
Figure 12:
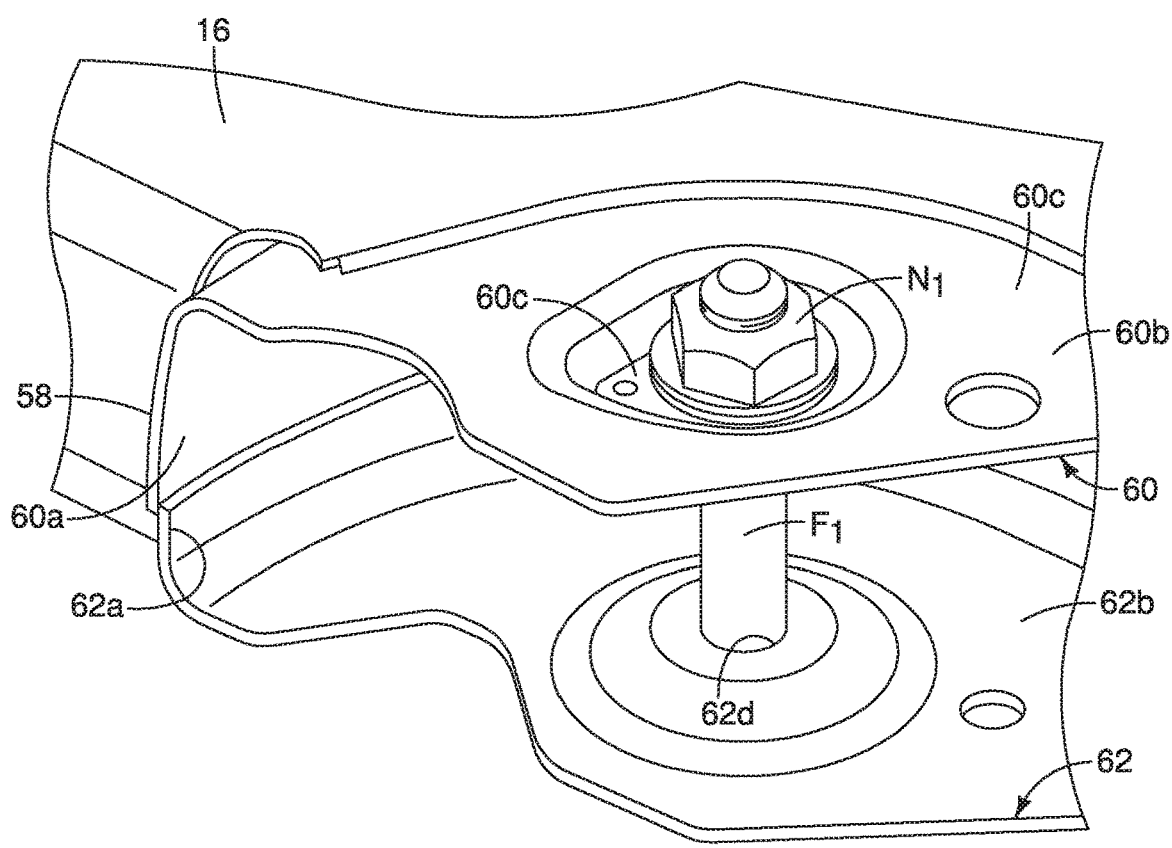
FIG. 12 is a perspective view of the attachment assembly depicted in FIG. 11, with the transverse link removed in accordance with the exemplary embodiment.

The upper attachment member 60 and the lower attachment member 62 are welded to one another, and further welded to the driver's rearward side of the engine cradle 16, as shown in FIGS. 7, 11 and 12. When fully welded together and welded to the engine cradle 16, the attachment assembly 58 is a box-like structure open to an outboard side of the vehicle 10. Further, once welded in place to the engine cradle 16, the upper attachment portion 60b and the lower attachment portion 62b are spaced apart from one another, both being rigidly attached to the engine cradle 16 and to one another via, for example, any of a variety of welding techniques.

The upper attachment portion 60b has a recessed area 60c defining a first opening 60d that extends through the recessed area 60c of the upper attachment portion 60b. The recessed area 60c is basically a depression or concaved area along an upper surface 60e of the upper attachment portion 60b.

Figure 9:
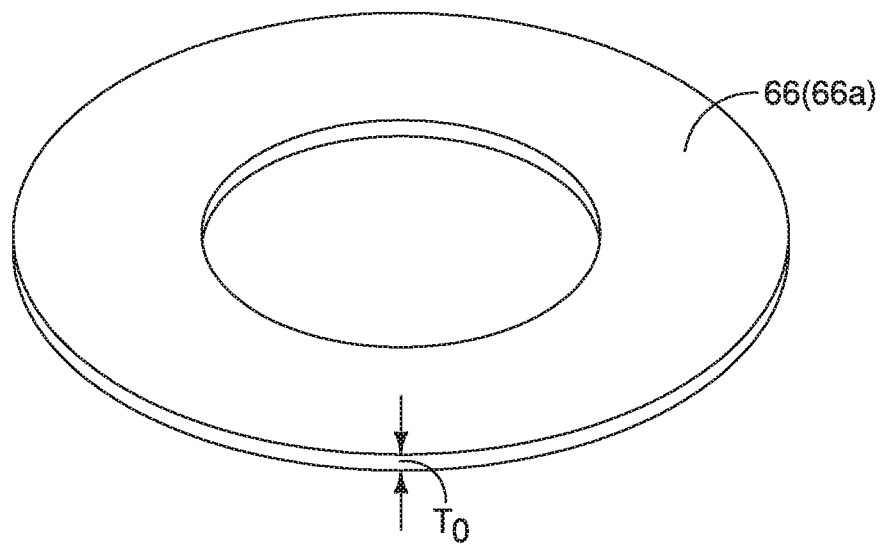
FIG. 9 is a perspective view of an annular plate that is attached to the upper attachment member in accordance with the exemplary embodiment.
Figure 10:
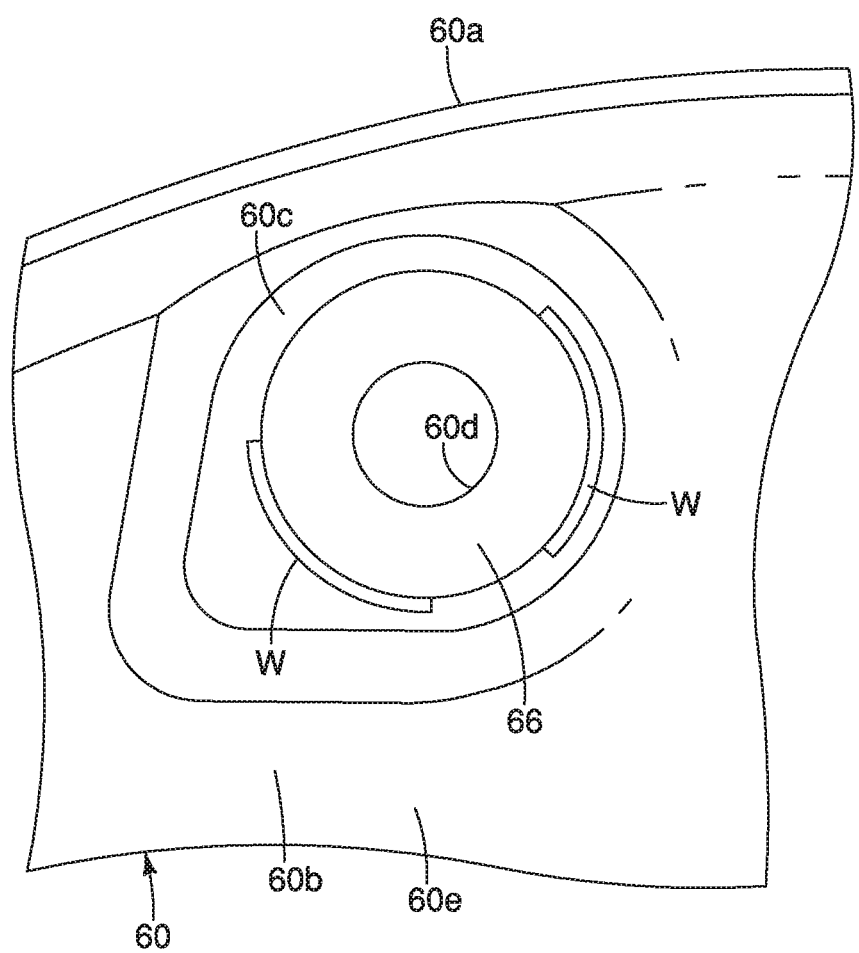
FIG. 10 is a top view of the upper attachment member showing the annular plate welded thereto in accordance with the exemplary embodiment.

As shown in FIGS. 7-12 and 14, an annular plate 66 is installed within the recessed area 60c and is fixedly attached thereto via welds W. As shown in FIG. 10 in the depicted embodiment, there are two welded areas, the welds W. The welds W each have a crescent shape and are spaced apart from one another one being at a rearward side of the annular plate 66 and one along an outboard side of the annular plate 66. The annular plate 66 resembles a washer and is preferably made of a rigid metallic material. More specifically, the annular plate 66 is welded to the upper surface 60e of the engine cradle 16 within the recessed area 60c. A central opening of the annular plate 66 is aligned with the first opening 60d of the upper attachment portion 60b. As shown in FIG. 9, the annular plate 66 has an overall thickness $T_0$.

As shown in FIG. 11, the upper attachment portion 60b has a first overall thickness $T_1$. A portion of the recessed area 60c surrounding the first opening 60d (corresponding to the location of the annular plate 66) has a second thickness $T_2$ that is greater than the first thickness $T_1$. Further, the second thickness $T_2$ is approximately equal to the sum of the first thickness $T_1$ of the upper attachment portion 60b and the overall thickness $T_0$ of the annular plate 66. The union of the annular plate 66 and the recessed area 60c of the upper attachment portion 60b increases the overall strength and resistance to deformation of the attachment assembly 58 and the rearward side of the engine cradle 16, as is described further below.

The lower attachment member 62 has a recessed area 62c defining a second opening 62d that extends through the recessed area 62c of the lower attachment portion 62b. The recessed area 62c is basically a concaved area along a lower surface 60e of the lower attachment portion 62b.

As shown in FIG. 11, an annular plate 66a is installed within the recessed area 62c and is fixedly attached thereto via welds (not shown) in a manner similar to the annular plate 66. The annular plate 66a is identical to the annular plate 66. A central opening of the annular plate 66a is aligned with the second opening 62d of the lower attachment portion 62b. As shown in FIG. 9, the annular plate 66a has an overall thickness $T_0$.

As shown in FIG. 11, the lower attachment portion 62b has a third overall thickness $T_3$. A portion of the recessed area 62c surrounding the second opening 62d (corresponding to the location of the annular plate 66a) has a fourth thickness $T_4$ that is greater than the third thickness $T_3$. Further, the fourth thickness $T_4$ is approximately equal to the sum of the third thickness $T_3$ of the lower attachment portion 62b and the overall thickness $T_0$ of the annular plate 66a. The union of the annular plate 66a and the recessed area 62c of the lower attachment portion 62b further increases the overall strength and resistance to deformation of the attachment assembly 58 and the rearward side of the engine cradle 16, as is described further below.

The second opening 62d is below the first opening 60d and is vertically aligned with the first opening 60d. In other words, the first opening 60d and second opening 62d are axially aligned with one another such that a heavy-duty fastener $F_1$ can be installed such that the fastener $F_1$ extends through the first opening 60d and the second opening 62d, as shown in FIG. 12.

The area of upper attachment portion 60b within the recessed area 60c with the annual plate 66 and the lower attachment portion 62b within the recessed area 62c with the annual plate 66a are referred to herein below as a forward inboard attachment section.

Figure 13:
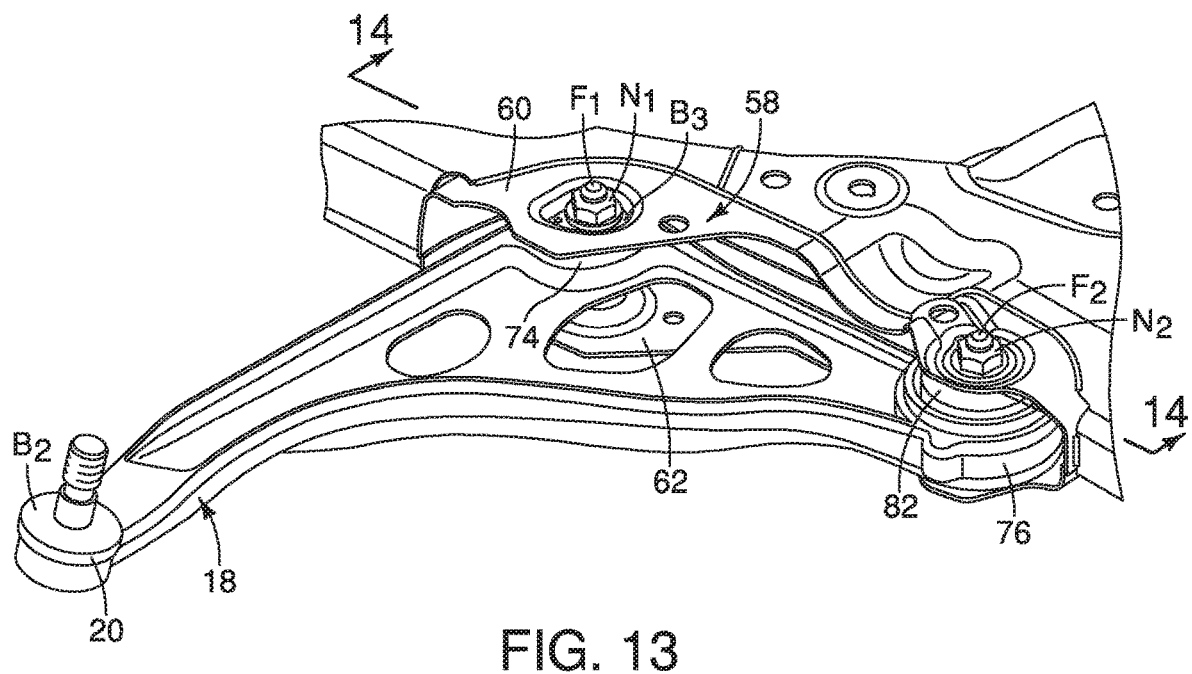
FIG. 13 is another perspective view of the attachment assembly depicted in FIGS. 11 and 12, with the transverse link installed thereto in accordance with the exemplary embodiment.
Figure 14:
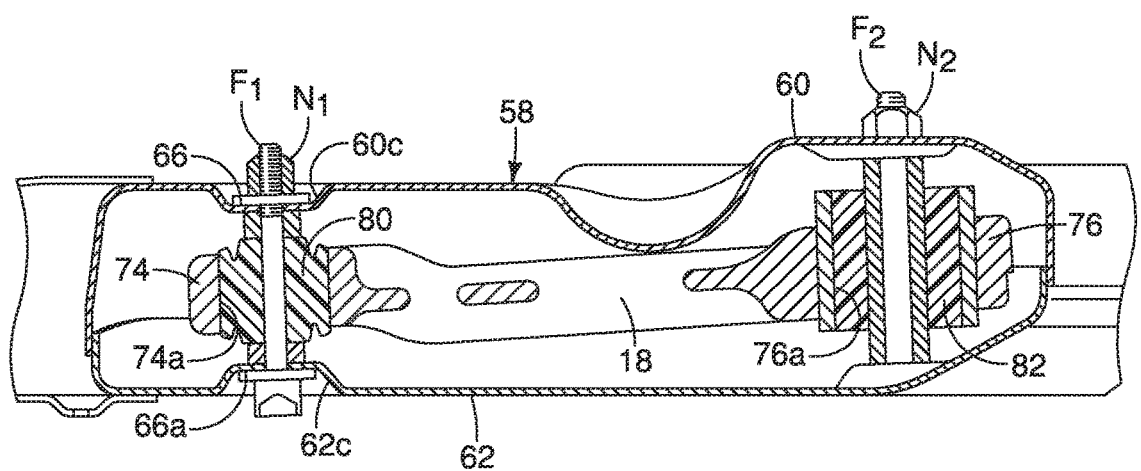
FIG. 14 is a cross-sectional perspective view of the attachment assembly with the transverse link installed thereto, taken along the line 14-14 in FIG. 13 in accordance with the exemplary embodiment.

As shown in FIGS. 7 and 8, the upper attachment portion 60b further includes an upper rear opening 70 that is similarly aligned with a lower rear opening 72 in the lower attachment portion 62b. As shown in FIGS. 13 and 14, a second fastener $F_2$ can be installed to extend through the upper rear opening 70 and the lower rear opening 72. As is further described below, the first and second fasteners $F_1$ and $F_2$ secure the transverse link 18 to the engine cradle 16. The first and second fasteners $F_1$ and $F_2$ are retained in place by first and second threaded nuts $N_1$ and $N_2$, as shown in FIGS. 13 and 14.

The upper attachment portion 60b in the area surrounding the upper rear opening 70 and the lower attachment portion 62b in the area surrounding the lower rear opening 72 a rearward inboard attachment section.

Figure 15:
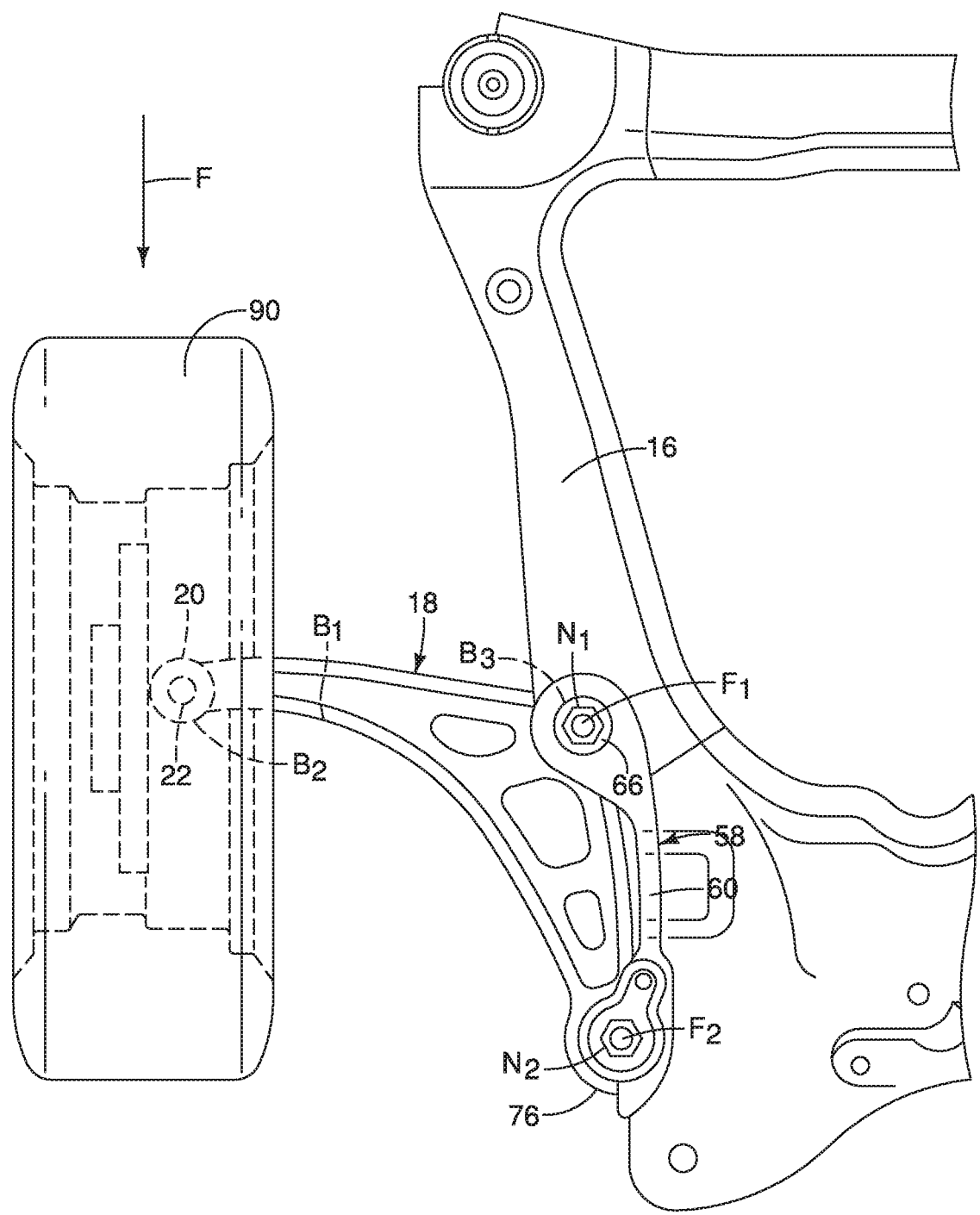
FIG. 15 is a top view of an outboard portion of the engine cradle with the transverse link, the steering knuckle and a wheel assembled showing breakaway areas of the vehicle front-end assembly in accordance with the exemplary embodiment.

A description of the transverse link 18 is now provided with specific reference to FIGS. 13-15. The transverse link 18 has the outboard end 20, the ball joint 22 (press-fitted to the outboard end 20), a forward inboard portion 74 and a rearward inboard portion 76. The transverse link 18 has an overall triangular shape with the outboard end 20, the forward inboard portion 74 and the rearward inboard portion 76 each defining one of the three vertices of the triangular shape. The forward inboard portion 74 is also referred to herein below as an inboard portion 74 of the transverse link 18 (a forward inboard portion).

As shown in FIG. 14, the forward inboard portion 74 defines an opening 74a that includes a bushing 80 press-fitted into the opening 74a. The rearward inboard portion 76 defines an opening 76a that includes a bushing 82 press-fitted into the opening 76a.

When the transverse link 18 is installed to the engine cradle 16, the forward inboard portion 74 and the rearward inboard portion 76 are inserted into the outboard facing opening defined by the attachment assembly 58. A central opening in the bushing 80 is aligned with the first opening 60d and the second opening 62d. Thereafter, the first fastener $F_1$ is inserted through the second opening 62d, through the central opening in the bushing 80 and further through the first opening 60d. The nut $N_1$ is threaded on to the first fastener $F_1$ and tightened. Similarly, the rearward inboard portion 76 is inserted into the outboard facing opening defined by the attachment assembly 58. A central opening in the bushing 82 is aligned with the upper rear opening 70 and the lower rear opening 72. Thereafter, the second fastener $F_2$ is inserted through the lower rear opening 72, through the central opening in the bushing 82 and further through the upper rear opening 70. The nut $N_2$ is threaded on to the first fastener $F_1$ and tightened.

The transverse link 18 is configured to provide a predetermined response to an impact event, where an impacting force F (FIG. 15) is applied to a front wheel 90 or the area around the front wheel 90 (see FIG. 15). Specifically, in response to the impacting force F, the transverse link 18 can undergo a breakaway process where a first breakaway location $B_1$ proximate the outboard end 20 breaks away from the inboard remainder of the transverse link 18. The first breakaway location $B_1$ is adjacent to but spaced apart in an inboard direction from the outboard end 20 of the transvers link 18, as shown in FIG. 15.

A description of such a breakaway process and corresponding breakaway structure is described in commonly assigned U.S. application Ser. No. 14/305,892, filed Jun. 16, 2014, published as US Pub. No. 2014/0291956, and issued as U.S. Pat. No. 9,254,724 to Corby, et al. U.S. Pat. No. 9,254,724 is incorporated herein by reference in its entirety.

Further, in response to the impacting force F of the impact event, the ball joint 22 can break away, or the outboard end 20 can breakaway releasing the ball joint 22 and the steering knuckle 24. Hence, the ball joint 22 and the outboard end 20 define a second breakaway location $B_2$.

As well, the section of the upper attachment member 60 within recessed area 60c with the annular plate 66 and having the second thickness $T_2$, along with the lower attachment member 62 within recessed area 62c with the annular plate 66a, define a third breakaway location $B_3$.

The vehicle front-end assembly 14 is configured such that in response to the impacting force F engaging the front wheel 90, a reaction first occurs at the first breakaway location $B_1$. The reaction is a breakaway at the first breakaway location $B_1$ where the outboard end 20 completely separates from the inboard portions of the transverse link 18 at the first breakaway location $B_1$. Continuing amounts of impacting force, or a force greater than the impacting force F will cause a second reaction at the second breakaway location $B_2$. The second reaction is a breakaway at the second breakaway location $B_2$ where the ball joint 22 is released from the outboard end 20 or where a lower portion of the steering knuckle 24 breaks away or a section of the outboard end 20 at the ball joint 24 breaks away. Continuing amounts of impacting force, or a force much greater than the impacting force F will cause a third reaction at the third breakaway location $B_3$. The third reaction is a breakaway at the third breakaway location $B_3$ where the upper attachment portion 60b of the upper attachment member 60 at the recessed area 60c and the annular plate 66, deforms, breaks or otherwise allows the forward inboard position 74 of the transverse link 18 to break away from the engine cradle 16. Simultaneously, the recessed area 62c and annular plate 66a can also possibly allow a breakaway of the forward inboard portion 74. With a break away at the third breakaway location $B_3$, the transverse link 18 pivots abut the second fastener $F_2$ such that the wheel 90 and the forward inboard portion 74 of the transverse link 18 pivot in an outboard direction away from the vehicle front end structure 14.

The first, second and third reactions at respective ones of the first, second and third breakaway locations $B_1$, $B_2$ and $B_3$, are possible because of the level of shear strength and overall strength of the structures at each of the first, second and third breakaway locations $B_1$, $B_2$ and $B_3$.

The transverse link 18 at the first breakaway locations $B_1$ has a predetermined geometry, thickness, width and height that provides a first predetermined strength (shear strength) to the transverse link 18. In other words, the first breakaway locations $B_1$ has a first predetermined strength to resist the impacting force F.

The transverse link 18, the ball joint 22 and the lower section of the steering knuckle 24 at the second breakaway locations $B_2$ has a second predetermined strength (including shear strength) that resists the impacting force F, the second predetermined strength $B_2$ is greater than the first predetermined strength at the first breakaway locations $B_1$.

Further, the transverse link 18, the upper attachment portion 60b of the upper attachment member 60 at the recessed area 60c and the annular plate 66, the recessed area 62c and annular plate 66a and the first fastener $F_1$ that at least partially define the third breakaway location $B_3$ have a third predetermined strength that resists the impacting force F. The third predetermined strength $B_3$ is greater than the first predetermined shear strength at the first breakaway locations $B_1$ and greater than the second predetermined shear strength at the second breakaway locations $B_2$.

Put another way, the strength of the structure at the first breakaway location $B_1$ is able to resist a breakaway of the outboard end 20 from the remainder of the transverse link 18 during an impact event with levels of force lower than a first threshold of force. Levels of force above the first threshold of force causes a breakaway event at the first breakaway location $B_1$.

The strength of the structure at the second breakaway locations $B_2$ is sufficient to resist a breakaway at the outboard end 20 of the transverse link 18 during an impact event with levels of force lower than a second threshold of force. Levels of force above the second threshold of force causes a breakaway event at the second breakaway location $B_2$. The second threshold of force is greater than the first threshold of force.

The strength of the structures at the third breakaway locations $B_3$ is sufficient to resist a breakaway at forward inboard portion 74 of the transverse link 18, the recessed area 60c and the annular plate 66, and, the recessed area 62c and the annular plate 66a, during an impact event with levels of force lower than a third threshold of force. Levels of force above the third threshold of force causes a breakaway event at the third breakaway location $B_3$. The third threshold of force is greater than both the first and second thresholds of force.

The vehicle elements and components of the vehicle 10 shown in the drawings, other than the engine cradle 16 and the transverse link 18, are conventional components that are well known in the art. Since these vehicle elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle front-end assembly. Accordingly, these terms, as utilized to describe the present invention should be interpreted relative to a vehicle equipped with the vehicle front-end assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front end assembly, comprising p1 an engine cradle having an upper attachment portion and a lower attachment portion spaced apart from one another with both being rigidly attached to the engine cradle, the upper attachment portion having an upper surface and a recessed area surrounded by the upper surface, the recessed area being lower than the upper surface by a first distance, the recessed area including a first opening extending through the recessed area, the upper attachment portion having a first overall thickness with a portion of the recessed area surrounding the first opening having a second thickness that is greater than the first thickness, the lower attachment portion having a second opening below the first opening, the portion of the recessed area surrounding the first opening defining another upper surface that is lower than the upper surface of the upper attachment portion by a second distance that is less than the first distance;

a transverse link having an inboard portion with a third opening that extends through the inboard portion;

a fastener passing through the first opening, the third opening and the second opening such that the fastener retains the transverse link to the upper attachment portion and the lower attachment portion of the engine cradle.

2. The vehicle front end assembly according to claim 1, wherein the recessed area is a concaved area of an upper surface of the upper attachment portion.

3. The vehicle front end assembly according to claim 2, wherein the portion of the recessed area having the second thickness includes an annular plate welded to the upper surface of the upper attachment portion within the recessed area, the annular plate having a central opening concentrically aligned with the first opening.

4. The vehicle front end assembly according to claim 2, wherein the lower attachment portion includes an annular plate welded to a lower surface thereof such that the annular plate is centered around the second opening, the lower attachment portion having a third overall thickness, and, the annular plate and the lower attachment surrounding the second opening together have a fourth thickness greater than the third overall thickness.

5. The vehicle front end assembly according to claim 1, wherein the portion of the recessed area having the second thickness includes an annular plate welded to the upper attachment portion within the recessed area, the annular plate having central opening concentrically aligned with the first opening, the another surface being defined along the annular plate.

6. The vehicle front end assembly according to claim 1, wherein the traverse link includes an outboard portion that supports ball joint and a steering knuckle with a wheel of a vehicle attached to the steering knuckle such that, during an impact event the transverse link is configured to breakaway in an area proximate the ball joint in response to a first impacting force, and the upper attachment portion of the engine cradle is configured to breakaway in response to a predetermined impacting force that is greater than the first impacting force.

7. The vehicle front end assembly according to claim 1, wherein the recessed area of the upper attachment portion defines a breakaway location such that in response to a predetermined impacting force being applied proximate an outboard portion of the transverse link, the recessed area of the upper attachment portion breaks at the breakaway location, releasing the inboard portion of the transverse link.

8. The vehicle front end assembly according to claim 7, wherein the upper attachment portion and the lower attachment portion are located on a driver's side of the engine cradle, a passenger's side of the engine cradle includes a second upper attachment portion and a second lower attachment portion, the second upper attachment portion and the second lower attachment portion being spaced apart from one another with both being rigidly attached to the engine cradle, the second upper attachment portion having a recessed area that includes a fourth opening extending through the recessed area, the second upper attachment portion having a third overall thickness with a portion of the recessed area surrounding the fourth opening having a fourth thickness that is greater than the third thickness, the second lower attachment portion having a fifth opening below the first opening, a second transverse link has a second inboard portion with a sixth opening rearward of the first opening, the second opening extending through the second inboard portion;

a second fastener passing through the fourth opening, the sixth opening and the fifth opening such that the second fastener retains the second transverse link to the second upper attachment portion and the second lower attachment portion of the engine cradle.

9. The vehicle front end assembly according to claim 8, wherein the outboard portion of the traverse link supports a ball joint and a steering knuckle with a wheel of a vehicle attached to the steering knuckle such that, during an impact event the transverse link is configured to breakaway in an area proximate the ball joint in response to a first impacting force, and the recessed area of the upper attachment portion of the engine cradle is configured to breakaway in response to the predetermined impacting force that is greater than the first impacting force.

10. The vehicle front end assembly according to claim 9, wherein the second traverse link includes an outboard portion that supports second ball joint and a second steering knuckle, with a second wheel of a vehicle attached to the second steering knuckle such that, during an impact event the second transverse link is configured to breakaway in an area proximate the second ball joint in response to a second impacting force, and the upper attachment portion of the engine cradle is configured to breakaway in response to the predetermined impacting force that is greater than the second impacting force.

11. A vehicle front end assembly, comprising an engine cradle having an attachment assembly with a forward inboard attachment section and rearward inboard attachment section, the forward inboard attachment section being defined by an upper horizontally oriented metallic member and a lower horizontally oriented metallic member spaced apart from one another, the upper horizontally oriented metallic member having an upper recessed area and the lower horizontally oriented metallic member having a lower recessed area; and a transverse link having a forward inboard portion attached to the forward inboard attachment section between the upper and lower horizontally oriented metallic members by a fastener that extends through respective openings in the upper and lower recessed areas, a rearward inboard portion attached to the rearward inboard attachment section and an outboard end having a ball joint installed thereto, a portion of the transverse link adjacent to and located inboard of the outboard end defining a first breakaway location, and, the outboard end and the ball joint defining a second breakaway location, and wherein the upper recessed area of the upper horizontally oriented metallic member and the lower recessed area of the lower horizontally oriented metallic member define a third breakaway location such that in response to an impact event of a first impacting force the outboard end of the transverse link breaks away from inboard portions of the transverse link at the first breakaway location prior to a breakaway event at the second breakaway location and the third breakaway location, and, in response to a predetermined impacting force greater than the first impacting force being applied proximate the outboard end of the transverse link, the upper and lower recessed areas break at the third breakaway location, releasing the inboard portion of the transverse link.

12. The vehicle front end assembly according to claim 11, wherein in response to the impact event the ball joint at the outboard end of the transverse link breaks away from the outboard end of the transverse link at the second breakaway location prior to a breakaway event at the third breakaway location.

13. The vehicle front end assembly according to claim 11, wherein the attachment assembly of the engine cradle includes an upper attachment portion and a lower attachment portion spaced apart from one another with both being rigidly attached to the engine cradle, with the forward inboard attachment section being at least partially defined by a recessed area of the upper attachment portion, the recessed area defining a first opening extending through the recessed area the upper attachment portion having a first overall thickness with a portion of the recessed area surrounding the first opening having a second thickness that is greater than the first thickness.

14. The vehicle front end assembly according to claim 13, wherein the forward inboard attachment section being further partially defined by a recessed area of the lower attachment portion, the recessed area defining a second opening extending through the recessed area the lower attachment portion having a third overall thickness with a portion of the recessed area surrounding the first opening having a fourth thickness that is greater than the third thickness.

15. The vehicle front end assembly according to claim 14, wherein the portion of the recessed area of the upper attachment portion having the second thickness includes an annular plate welded to the upper surface of the upper attachment portion within the recessed area, the annular plate having a central opening concentrically aligned with the first opening.

16. The vehicle front end assembly according to claim 15, wherein the portion of the recessed area of the upper attachment portion having the fourth thickness includes an annular plate welded to the lower surface of the lower attachment portion within the recessed area, the annular plate having a central opening concentrically aligned with the third opening.

\* \* \* \* \*